United States Patent
Mizushima (10) Patent No.: US 8,354,993 B2
(45) Date of Patent: Jan. 15, 2013

(54) DISPLAY APPARATUS CAPABLE OF REDUCING POWER CONSUMPTION

(75) Inventor: Toshiaki Mizushima, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 685 days.

(21) Appl. No.: 12/586,648

(22) Filed: Sep. 24, 2009

(65) Prior Publication Data

US 2011/0069042 A1 Mar. 24, 2011

(51) Int. Cl.
*G09G 3/36* (2006.01)
(52) U.S. Cl. .................... 345/102; 345/204; 345/211
(58) Field of Classification Search .................. None
See application file for complete search history.

(56) References Cited

U.S. PATENT DOCUMENTS 7,562,242 B2 * 7/2009 Hori .............................. 713/324

FOREIGN PATENT DOCUMENTS

JP 2003-271106 A 9/2003

* cited by examiner

*Primary Examiner* — Muhammad N Edun
(74) *Attorney, Agent, or Firm* — Masuvalley & Partners (57) ABSTRACT

A display apparatus includes a display device and a backlight for indicating a sign, which represents that the display apparatus has no image signal in case the display apparatus is not receiving image signal inputted from outside. The display apparatus has a controller, which indicates the sign intermittently on the display device while the display apparatus has no signal and the controller turns off power of the backlight while there is no sign on the display device.

14 Claims, 8 Drawing Sheets

DISPLAY APPARATUS CAPABLE OF REDUCING POWER CONSUMPTION

TECHNICAL FIELD

The present invention relates to reduction of power consumption and improvement of operating life for liquid crystal displays or EL (Electro Luminescent) displays used in broadcasting or commercial fields.

BACKGROUND OF THE INVENTION

In recent years, transition from CRT displays to liquid crystal displays has been progressing as displays for personal computers. The CRT displays use Braun tubes and the liquid crystal displays have characteristics of light weight, flat screen, and the like. It is certain that the transition from CRT displays to liquid crystal displays, or EL displays, which will be fully introduced, will be made in the future not only for the displays used for personal computers but also for the market in which the CRTs have been used, such as for television, broadcasting, commercial use, or medical field.

One of the characteristics of crystal displays is lower power consumption comparing to CRT displays. However, the majority of the power is consumed by backlight (normally, a cold-cathode tube which is similar to fluorescent tube, is used). Further, with the strong demand for high brightness, the brightness of the backlight has been increased, and the power consumption tends to be increasing.

By the way, many of current CRT displays and liquid crystal displays automatically switch to a power save mode to reduce the power consumption when there is no image signal. In the power save mode, a screen turns into black because the power of cathode-ray tube section or liquid crystal section (or backlight) is turned off when there is no image signal. By this function, the power consumption can be automatically reduced when there is no image signal. For example, the power save mode can be used to a display for personal computer because there is no signal provided from the computer to the display when key operation or mouse operation is not performed for a predetermined time.

Meanwhile, one of Japanese patent documents discloses a display having a structure in which the brightness of the liquid crystal backlight is reduced, or the gain of data of an image signal itself is reduced, by automatically recognizing a specific still image, such as color bar. The document indicates that the power consumption can be saved by using this function when the display is not in use even when the image signal is consistently input.

Because these functions are effective functions for saving the power consumption, it is thought that the similar power save control will be applied to new displays, such as EL displays, that will be introduced in the future. However, in case there is no image signal, the method of reducing the power consumption of overall display device by turning off the backlight has a problem of potentially confusing users by completely turning off the backlight because the users do not understand why the screen turned black. In addition, the method of informing users of no image signal with "No Signal" on the screen has a problem of not being able to reduce the power consumption while it can inform the user of no signal state because the backlight needs to be kept on. Under these circumstances, there has been a demand for new technique to reduce the power consumption of display devices while informing users that there is no image signal.

SUMMARY OF THE INVENTION

An aspect of the present invention is a display apparatus having a display device and a backlight for indicating a sign, which represents that the display apparatus has no image signal in case the display apparatus has no image signal inputted from outside, the display apparatus including,
a controller, which indicates the sign intermittently on the display device while the display apparatus has no signal and the controller turns off power of the backlight while there is no said sign on the display device.

Another aspect of the present invention is a display apparatus having a display device and a backlight for indicating a sign, which represents that the display apparatus has no image signal in case the display apparatus has no image signal on the display device, the display apparatus including:
a controller, which indicates the sign intermittently on the display device while the display apparatus has no image signal and a value of a first electronic power consumed by the backlight while displaying no sign on the display device is lower than a value of a second electronic power consumed by the backlight while displaying said sign on the display device.

Another aspect of the present invention is a method of reducing electronic power consumption of a display apparatus including a display device and a backlight for indicating a sign, which represents that the display apparatus has no image signal in case the display apparatus has no image signal inputted from outside, the method including the steps of
intermittently indicating the sign on the display device while the display apparatus has no image signal; and
turning off power of the backlight while the sign is not indicated on the display device.

DETAILED DESCRIPTION OF INVENTION

Figure 1:
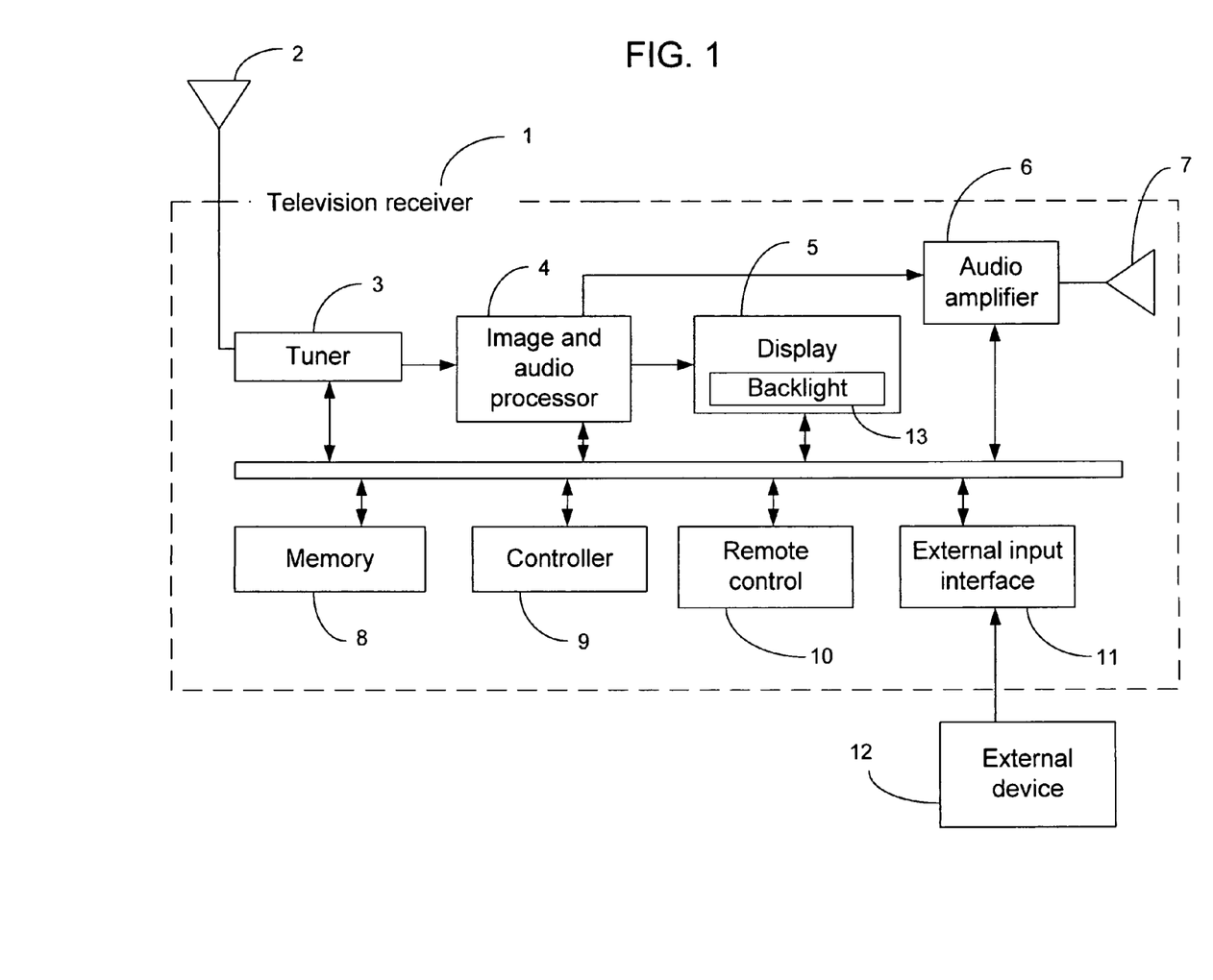
FIG. 1 is a diagram illustrating an overall configuration of a television receiver of the present invention.

A display 5 of the present invention will hereinafter be explained according to attached figures. FIG. 1 is a diagram illustrating an overall configuration of a television receiver 1 pertaining to the present invention. The television receiver 1 pertaining to the present invention is configured from a tuner 3, an image/audio processor 4, a display 5 provided with a backlight 13, an audio amplifier 6, a speaker 7, memory 8, a controller 9, remote control 10, and an external input interface 11. FIG. 1 further shows a receiving antenna 2 and an external device 12 that can be connected to the television receiver 1 pertaining to the present invention.

In order to receive an analog broadcast and a digital broadcast, the receiving antenna 2 is arranged outdoors facing to a predetermined direction. The receiving antenna 2 receives a digital broadcast signal or an analog signal and inputs it to the tuner 3. The tuner 3 picks up a signal with a specific frequency from a high-frequency digital modulated signal containing image/audio data. Further, by having a demodulation circuit, a reverse interleave circuit, an error correction circuit etc., the tuner 3 demodulates the selected digital-modulated signal. Eventually, the tuner 3 selects a program of configured analog channel or digital channel and outputs a signal to the image/audio processor 4.

The image/audio processor 4 processes image and audio based on the signal input from the tuner 3 and outputs it to the display 5. The display 5 indicates an image on the display by the image signal output from the image/audio processor 4. Alternatively, the display 5 indicates an image by receiving an image signal from the external device 12 through the external input interface 11. A backlight is used to illuminate a display (liquid crystal display etc.) from backside. An edge light method (side-light method, guide light plate method and the like) and a direct-type method can be applied to the backlight. It is favorable to employ the direct-type method for liquid crystal displays. On the other hand, the edge-light method is suitable for small-size liquid crystal displays, laptop computers and LCD monitors.

The audio amplifier 6 is used to output the audio signal, which is outputted from the image/audio processor 4, to the speaker 7 and the like. Or, the audio amplifier 6 is used to output the audio signal of the external device 12 which is connected to the external input interface 11, to the speaker 7 and the like. The memory 8 is used to store control programs, image data, audio data, and other data. For example, RAM, EEPROM, flash memory and the like may be used as the memory. In addition to the information to indicate a EPG (Electronic Program Guide) screen (program information), channel information (frequency information, information, such as, channel list related to numeric keys), various setting information and the like are stored in the memory. The controller 9 is to perform entire control in the television receiver 1. As the processes pertaining to the present invention, the controller 9 especially performs an acquisition process for channel information, channel present setting, channel skip setting, and channel selection process or setting process corresponding to the key operation of the remote control 10. The remote control 10 can be used by users who use the display 5 to control the television receiver 1 according to the instruction from the users. As the external device 12, video cameras, DVD players, video recording devices and the like can be used. Further, HDMI (High-Definition Multimedia Interface) and the like can be applied as the external input interface 11.

Figure 2:
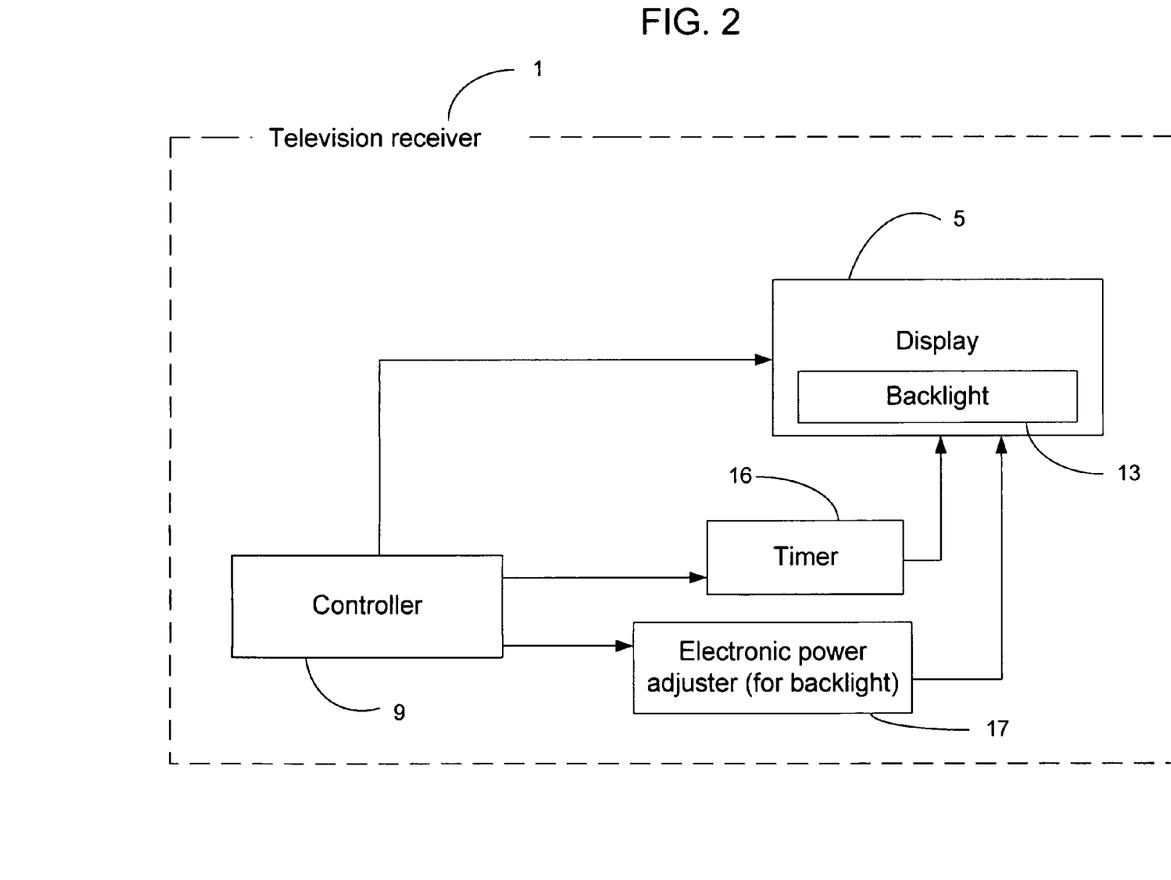
FIG. 2 is a diagram illustrating an example of a structure of a specific portion of the television receiver pertaining to the present invention.

Next, FIG. 2 will be explained. FIG. 2 is a diagram illustrating a structure of a specific portion of the television receiver 1 pertaining to the present invention. As shown in FIG. 2, the television receiver 1 includes the display 5 provided with the backlight 13 in the rear, and a controller 9 to control the display 5. One of the characteristics of the display 5 pertaining to the present invention is having the controller. In a case when the display 5 is not receiving an image signal which is input from outside of the display 5, the controller intermittently indicates a sign on a display device which represents that the display 5 is not receiving the image signal. In addition, the controller turns off the power of the backlight while the sign is not shown on the display device.

"Intermittently" referred herein means to repeat the operation of appearing the sign which represents that there is no image signal in the display 5 on the display device, disappearing the sign after a predetermined period of time, and further appearing the sign after a predetermined time. Further, the disappearance of the sign means not let the viewer acknowledge the sign on the display device by turning off the power of the backlight 13. On the other hand, the appearance of the sign means to let the view acknowledge the sign on the display device by turning off the power of the backlight 13.

In such a case, the period from the appearance to the disappearance of the sign and the period from the disappearance to the appearance of the sign can be arbitrarily decided by a designer as needed. Also, a viewer can arbitrarily determine the period for indicating the sign or change the setting. These periods from the appearance to the disappearance and from the disappearance to the appearance can be the same period or different period. For example, the period from the appearance to the disappearance of the sign and the period from the disappearance to the appearance of the sign may be set between about 3 seconds and about 15 seconds. Or the periods may be set to between about 5 seconds and 10 seconds. In a case when the period is about 3 seconds or less, there may be a possibility that viewers can not acknowledge that there is no signal in display 5. It is also possible that the viewers feel discomfort by the operation in which turning on and off of the sign is repeated in a short period of time. In view of these points, the period is preferably longer than about 3 seconds. Meanwhile, in a case when the period exceeds about 15 seconds, the period in which the backlight is turned off becomes significantly long. Thereby viewers do not know what is going on and it may result in confusing the viewers. In addition, if the period in which the backlight is turned on, exceeds about 15 seconds, the effect of the present invention, that is, the saving of power consumption, can not be achieved. For these reasons, the period is preferably not more than about 15 seconds.

Meanwhile, the period from the appearance to the disappearance of the sign and the period from the disappearance to the appearance of the sign may be different. For example, the period from the appearance to the disappearance of the sign may be set to about 5 seconds, and the period from disappearance to appearance of the sign may be set to about 15 seconds. These two types of the periods may be set such that one of the periods is set to longer, or shorter. However, in the view point of "saving the power consumption", namely, the main effect of the present invention, the period from the appearance to the disappearance of the sign is preferably shorter than the period from the disappearance to the appearance of the sign. In order to achieve dual objectives, namely, "saving the power consumption" and not to discomfort viewers, it is preferable to set the period from the appearance to the disappearance of the sign to about 3 seconds to 5 seconds, and to set the period from the disappearance to the appearance of the sign to about 10 seconds to 15 seconds. As shown in FIG. 2, the television receiver 1 has a timer 16 associated to the display 5, and the timer 16 is set to count the periods described above. The timer 16 is adjustable by the controller 9.

Meanwhile, "the sign indicated on the display device" described above refers to a sign that is enough to be acknowledged by the viewer that there is no image signal in the display 5. For example, the viewer may be informed by indicating a sign saying "No Signal" on the display device. Further, the characters of "No Signal" may be indicated on the display device with an alternation, such as picture or decoration. In addition, voice of "No Signal" and the like may be output from the speaker along with indicating above-described items to the viewer.

Further, the position for indicating the sign is not specifically limited to a specific portion as long as the position is within the range in which the viewers can recognize that there is no signal in the display 5. For example, the sign may be displayed on the entire display device or on a portion of the display device. In addition, the size of the sign on the display device is not specifically limited.

Meanwhile, the characteristics of the display 5 pertaining to the present invention may be that a sign which represents that the display 5 has no image signal in case the display 5 has no image signal input from outside of the display 5, and the value of the first electronic power which is consumed by the backlight while the sign is not indicated on the display device, is lower than the value of the second electronic power, which is consumed by the backlight while the sign is indicated on the display device. As described above, this is because the power used in the entire display apparatus can be reduced by significantly lowering the power used in the backlight, not by turning off the power of the backlight when the sign is not indicated on the display device. In such a case, the first electronic power which is consumed by the backlight, can be reduced as long as the value is in the range that can achieve the "saving the power consumption", that is, the main effect of the present invention.

Concretely, the brightness of the backlight is significantly lowered. In such a case, as a matter of course, the viewer may be able to acknowledge the sign on the display device or may not be able to acknowledge the sign. The degree for lowering the brightness of the backlight may be about not more than about 1/10 compare to the case where the sign is indicated on the display device, for example. This is because the objective is achieved and the power consumption reduction effect can also be achieved even in the case where the viewer cannot acknowledge the sign on the display device. The period for switching the value of the first electronic power and the value of the second electronic power may be set similar to the period from appearance and disappearance of the sign as described above. As shown in FIG. 2, the television receiver 1 has an electronic power adjuster 17 associated to the display 5, and the value of electronic power is adjustable by this electronic power adjuster 17. The electronic power adjuster 17 can be controlled by the controller 9.

Figure 3:
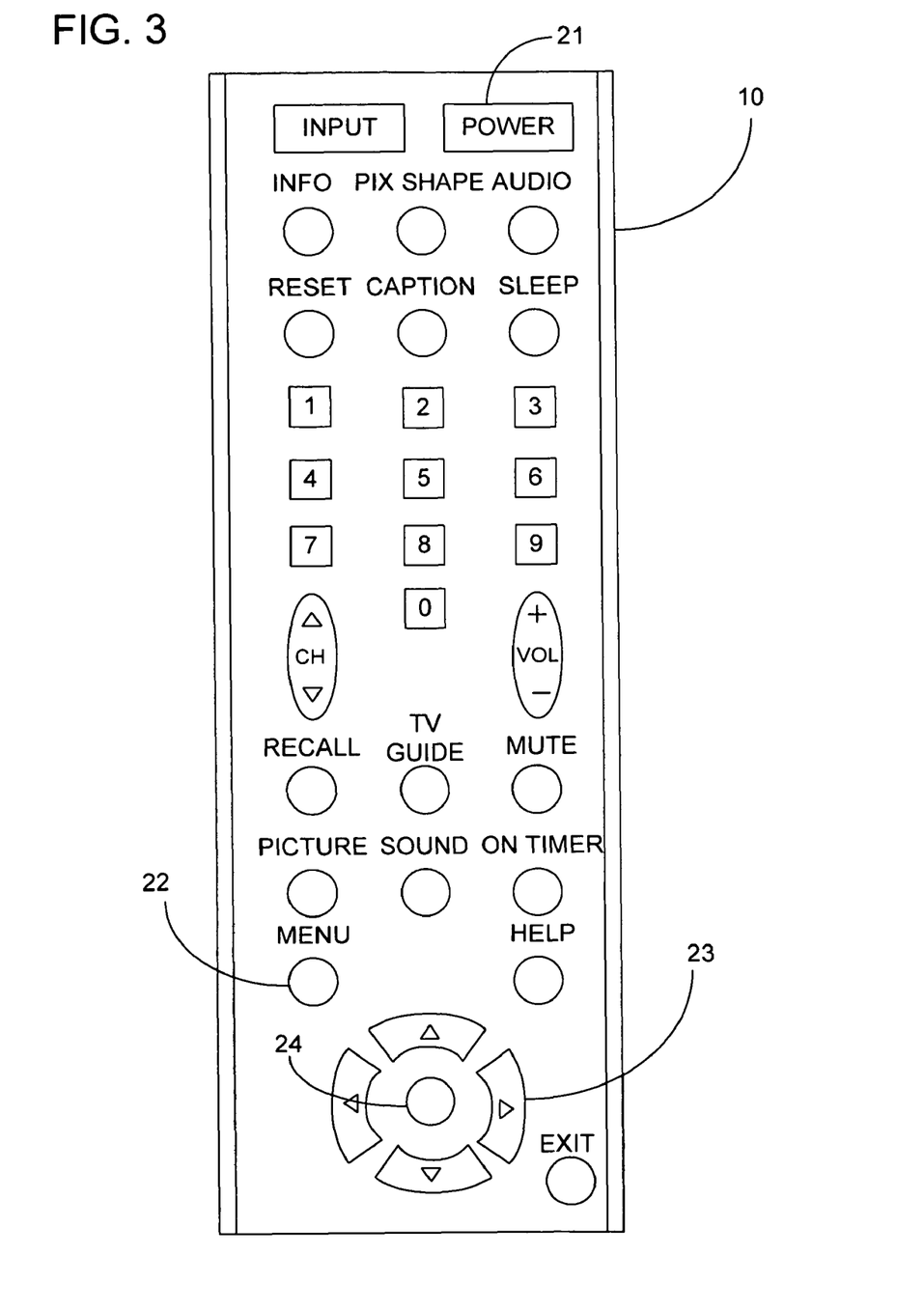
FIG. 3 is a diagram illustrating an example of a remote controller that can operate the television receiver pertaining to the present invention.

Next, FIG. 3 will be explained. FIG. 3 is a diagram illustrating an example of a remote controller that can be used to operate the television receiver pertaining to the present invention. As shown in FIG. 3, the remote controller 10 is provided with various keys to transmit various instructions to the television receiver. When operating the key, a signal light (remote control signal) which is an instruction corresponding to that key, is transmitted from a light emitting section. The remote controller 10 is provided with various input buttons, such as a POWER 21, a MENU 22, a Cursor Operating Key 23 and an ENTER 24. The power of the television receiver can be turned on or off by the POWER 21. Further, by the MENU 22, it becomes possible to enter into a screen, in which various settings of the television receiver (picture setting, audio setting etc.) can be changed. Since various options are displayed on the screen when entering into the menu screen, a user moves a cursor to those options by using the cursor operating key 23 and pressing the ENTER 24 to select the option. The operating method of the remote controller pertaining to the present invention is not specifically limited. However, the remote controller may normally be used by the method described above.

Figure 4:
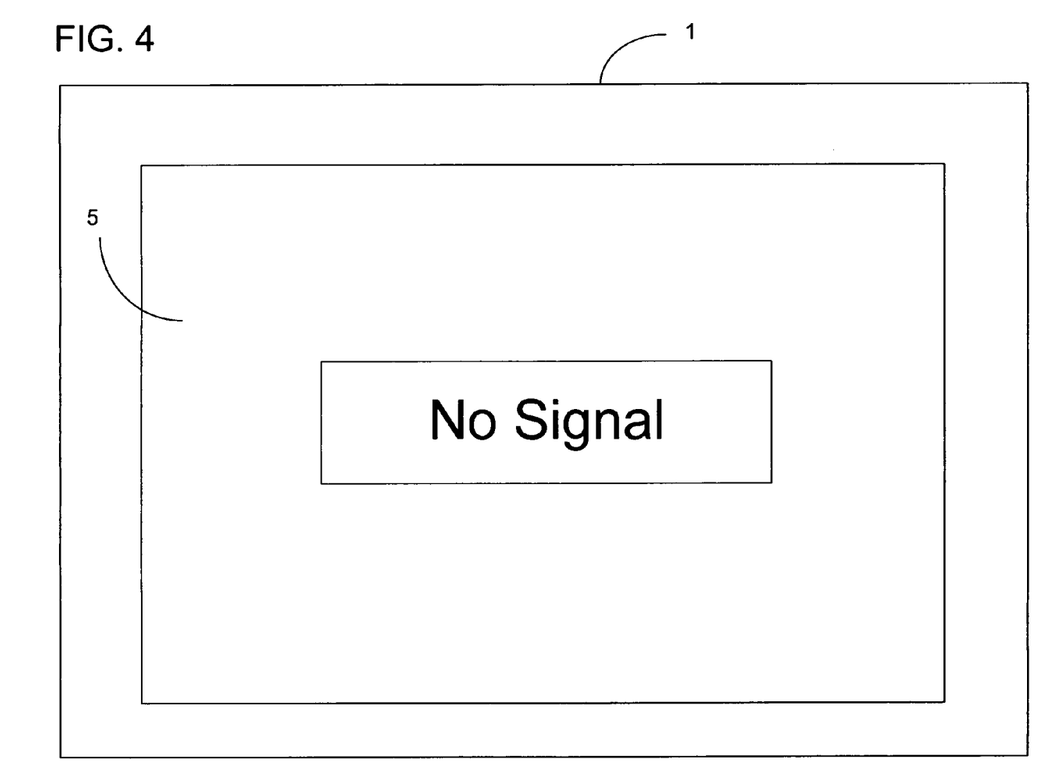
FIG. 4 is a diagram illustrating a representation example in a display of the television receiver pertaining to the present invention.

Next, FIG. 4 will be explained. FIG. 4 is a diagram illustrating a representation example on a display of the television receiver 1 pertaining to the present invention. As described above, in the case when the display 5 is not receiving an image signal from outside, a sign is shown to viewers. The sign indicates the viewers that the display 5 is not receiving the image signal. FIG. 4 is a diagram illustrating such a condition, and characters "No Signal" are displayed on the center of the screen. As described above, the forms, positions or the like of the sign is not specifically limited as long as the viewers can acknowledge that the display 5 is not receiving the image signal.

Figure 5:
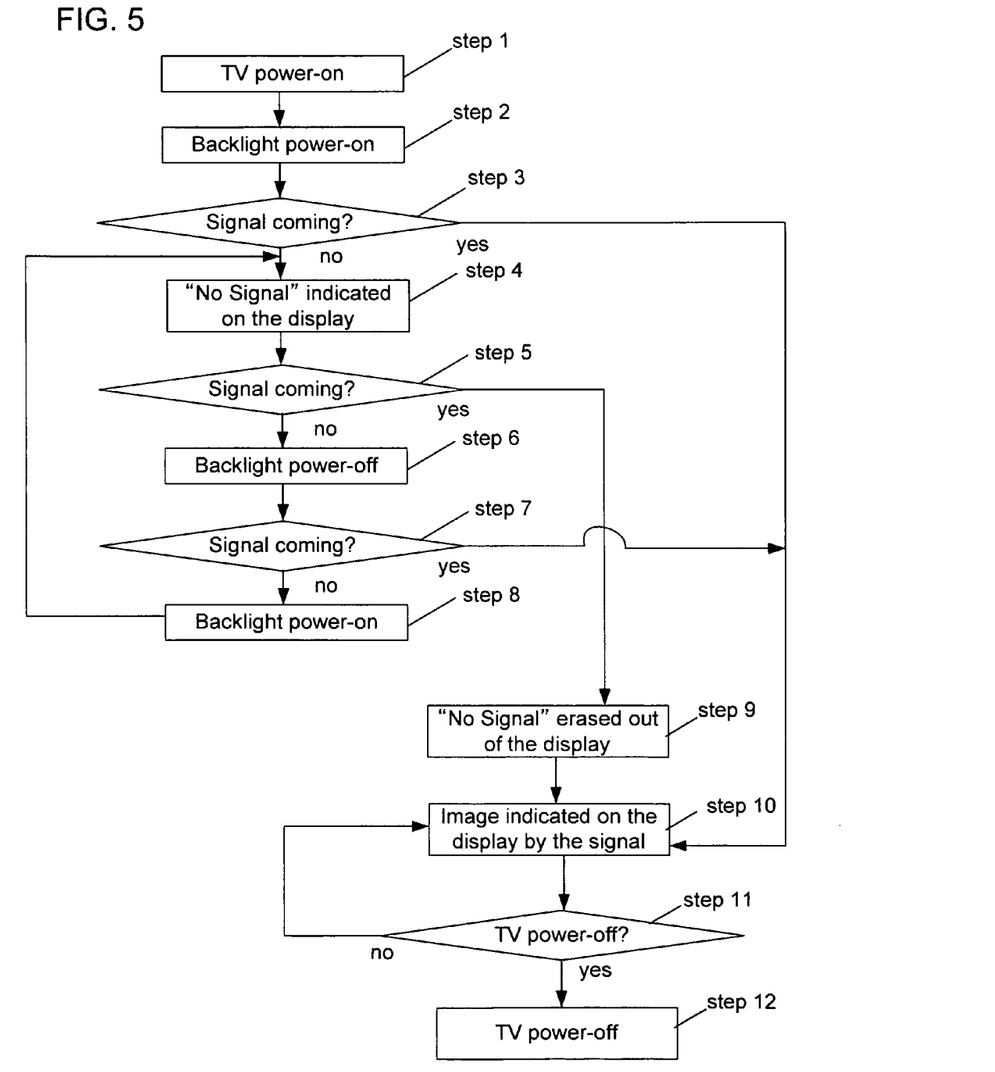
FIG. 5 is a diagram illustrating an example of operation of the television receiver pertaining to the present invention.

Next, FIG. 5 will be explained. FIG. 5 is a diagram illustrating an example of operation of the television receiver pertaining to the present invention. Firstly, when the power of the television receiver 1 is turned on (step 1), the power of the backlight 13 is turned on (step 2). The controller 9 determines whether or not the display 5 is receiving an image signal (step 3). In a case when the display 5 is receiving the image signal, the display of the image on a screen is started according to the signal (step 10). In a case when the display 5 is not receiving the image signal, the controller 9 shows the sign on the screen that the display 5 is not receiving the image signal (step 4). Thereafter, the controller 9 again determines whether or not the display 5 is receiving the image signal (step 5). In the case when the display 5 is receiving the image signal, the display of the image on the screen is started according to the signal (step 10) after ceasing the sign from the screen (step 9). In the case when the display 5 is not receiving the image signal, the controller 9 turns off the power of the backlight 13. (step 6). When the power of the backlight 13 is turned off, the screen turns black and the power consumption is saved.

Thereafter, the controller 9 again determines whether or not the display 5 is receiving the image signal (step 7). In the case when the display 5 is receiving the image signal, the display of the image on a screen is started according to the signal (step 10). In the case when the display 5 is not receiving the image signal, the controller 9 turns off the power of the backlight 13. (step 8). Then, the controller 9 again shows the sign on the screen (step 4). By repeating the process from the step 4 to step 10, the controller 9 repeats turning on and off of the power of the backlight at the same time when appearance and disappearance of the sign on the screen is repeated until the display 5 receives the image signal.

After displaying an image on the screen by the controller 9, a determination as to whether or not there is an instruction from a viewer to turn off the television receiver (step 11). In a case when there is the instruction to turn off the television receiver 1, the power of the television receiver 1 is turned off (step 12). In a case when there is no instruction to turn off the television receiver, the image is continually displayed on the screen (step 10).

Figure 6:
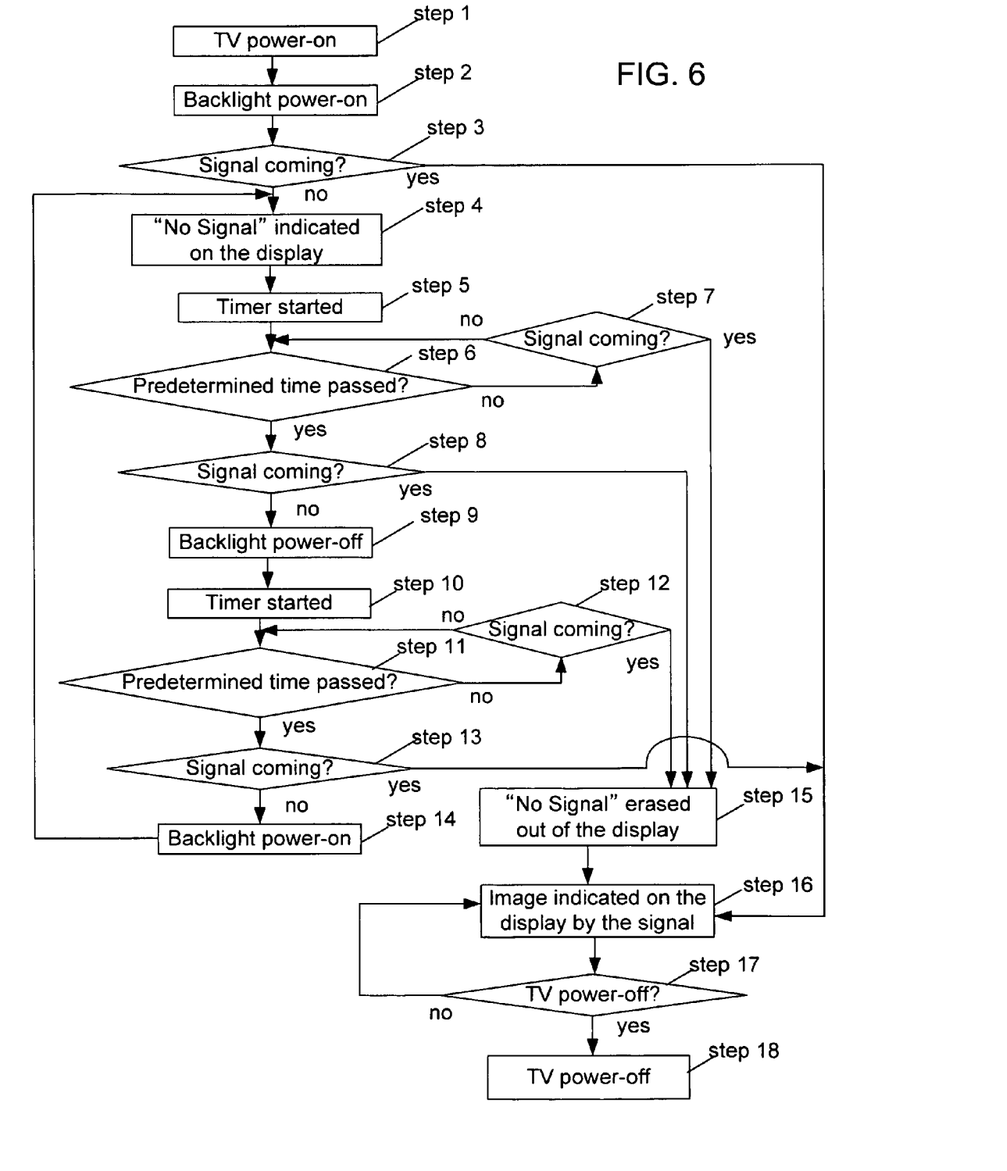
FIG. 6 is a diagram illustrating another example of operation of the television receiver pertaining to the present invention.

Next, FIG. 6 will be explained. FIG. 6 is a diagram illustrating another example of operation of the television receiver pertaining to the present invention. The operation shown in FIG. 6 is based on the operation shown in FIG. 5. In FIG. 6, an operation to count the interval between the operation to turn on and off the backlight 13 shown in FIG. 5 is added. Concretely, the timer 16 starts counting the interval (step 5) at the same time when displaying the sign which represents that the display 5 is not receiving the image signal in step 4. The period of time for displaying the sign on the screen is predetermined, and the timer 16 determines whether or not the period of time counted is reached to the predetermined period of time (step 6). If the period of time counted is not reached to the predetermined period of time, a determination is made as to whether or not the display 5 is receiving the image signal (step 7). In a case when the display is receiving the signal, broadcast of the image is started (step 16) after removing the sign from the screen (step 15). In a case when the display 5 is determined to be not receiving the image signal, the timer 16 continues to count the interval.

When the timer 16 determines that the period counted is reached to the predetermined period of time, the power of the backlight 13 is turned off (step 9) when the display 5 is not receiving the image signal. Concurrently with turning off the power of the backlight 13, the timer 16 starts counting the interval again (step 10). The period of time in which the sign is not displayed on the screen is predetermined, and the timer 16 determines whether or not the period counted is reached to the predetermined period (step 11). If the period counted is not reached to the predetermined period, a determination is made as to whether or not the display 5 is receiving the image signal (step 12). In a case when the display 5 is not receiving the signal, broadcast of the image is started (step 16) after removing the sign from the display (step 15). When the display 5 is determined to be not receiving the image signal yet, the timer 16 continues to count the interval. When the timer 16 determines that the period counted is reached to the predetermined period, the power of the backlight 13 is turned on (step 14), if the display 5 is not receiving the image signal. Then, the sign is displayed on the screen for the viewers (step 4). Because other operation in FIG. 6 is the same as that of FIG. 5, the explanation will be omitted.

Figure 7:
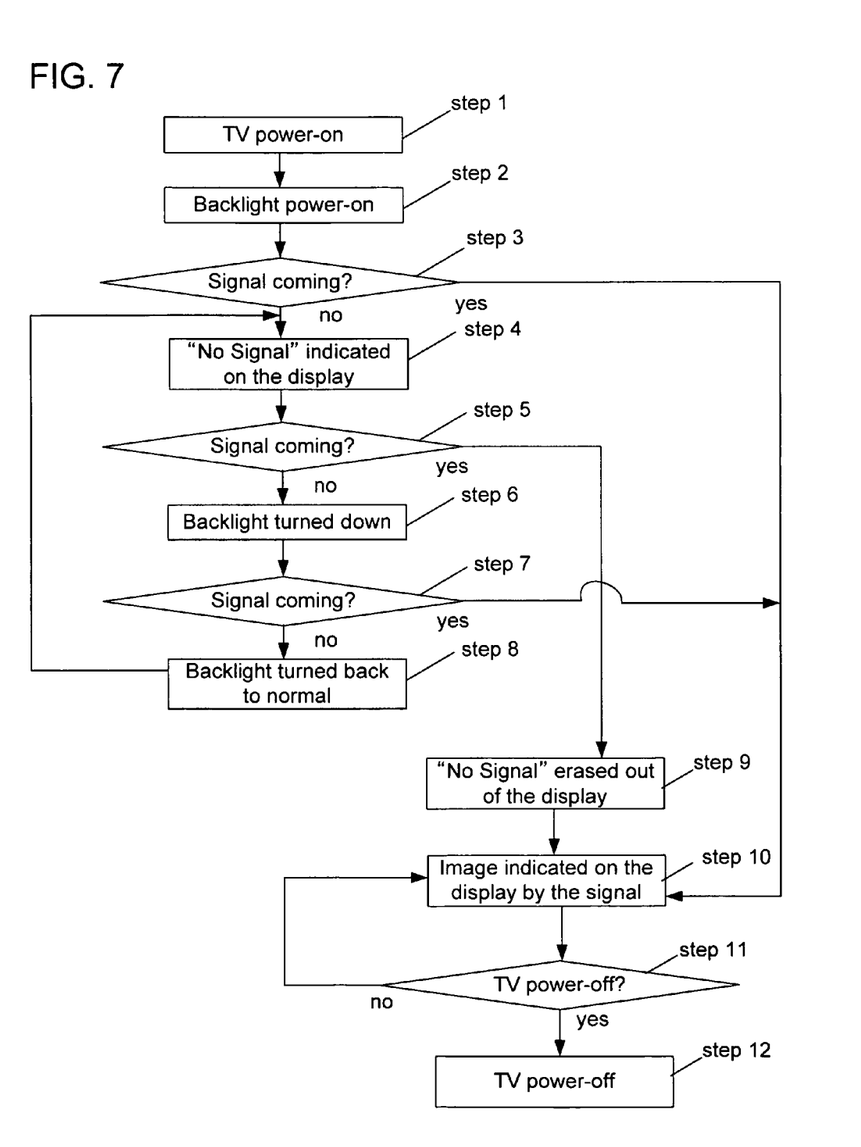
FIG. 7 is a diagram illustrating another example of operation of the television receiver pertaining to the present invention.

Next, FIG. 7 will be explained. FIG. 7 is a diagram illustrating an example of operation of the television receiver pertaining to the present invention. Firstly, when the power of the television receiver 1 is turned on (step 1), the power of the backlight 13 is turned on (step 2). Then, the controller 9 determines whether or not the display 5 is receiving an image signal (step 3). In the case when the display 5 is receiving the image signal, display of the image on the screen is started according to the signal (step 10). In the case when the display 5 is not receiving the image signal, the controller 9 indicates a sign which represents that the display 5 is not receiving the image signal on the screen (step 4). Thereafter, the controller 9 again determines whether or not the display 5 is receiving the image signal (step 5). In the case when the display 5 is receiving the image signal, the sign is removed from the screen (step 9) and the display of the image on the screen is started according to the received image signal (step 10). In the case when the display 5 is not receiving the image signal, the controller 9 decreases the power consumption by significantly lowering the brightness of the backlight 13 (step 6).

Thereafter, the controller 9 again determines whether or not the display 5 is receiving the image signal (step 7). In the case when the display 5 is receiving the image signal, the display of the image on the screen is started according to the image signal (step 10). In the case when the display 5 is not receiving the image signal, the controller 9 sets the brightness of the backlight 13 back to the condition before the brightness is lowered (step 8). Then, the controller 9 again indicates the sign on the screen (step 4).

After the controller 9 displays the image on the screen, a determination is made as to whether there is an instruction from a viewer to turn off the power of the television receiver 1 (step 11). When there is the instruction to turn off the power of the television receiver, the power of the television receiver 1 is turned off (step 12). When there is no instruction to turn off the power of the television receiver 1, the image is displayed continuously on the screen (step 10).

Figure 8:
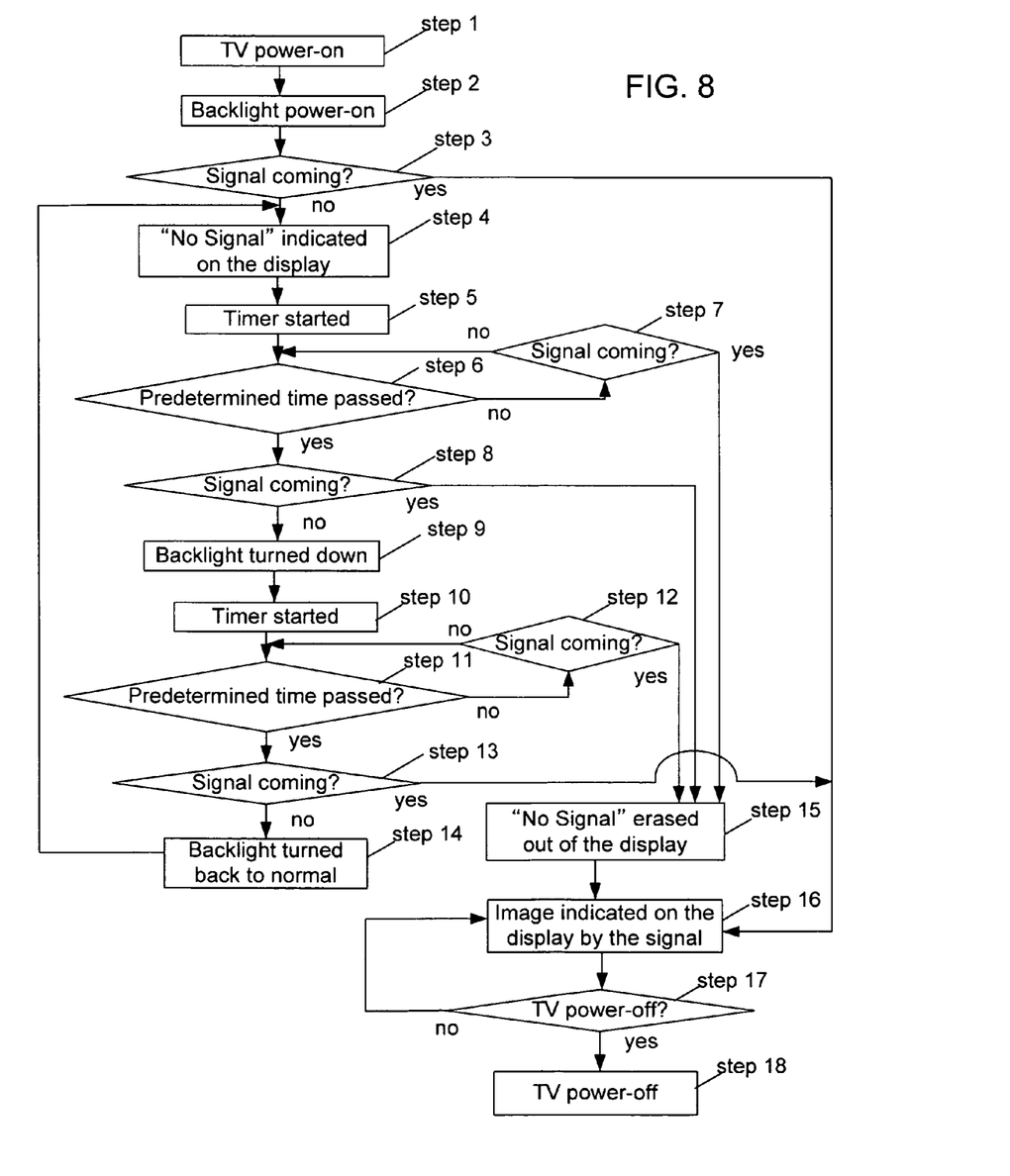
FIG. 8 is a diagram illustrating another example of operation of the television receiver pertaining to the present invention.

Next, FIG. 8 will be explained. FIG. 8 is a diagram illustrating another example of an operation of the television receiver pertaining to the present invention. The operation shown in FIG. 8 is based on the operation shown in FIG. 7. In FIG. 8, an operation is added. The operation is to count a period between the condition in which the electronic power value of the backlight 13 is decreased as shown in FIG. 7 and the condition in which the power value is set back to the original. Concretely, the timer 16 starts counting (step 5) concurrently with the indication of the sign which represents that the display 5 is not receiving the image signal on the screen in the step 4. The period of time for indicating the sign on the screen is predetermined, and the timer 16 determines the period of time counted is reached to the predetermined period of time (step 6). If the period of time counted is not reached to the predetermined time, a determination is made as to whether or not the display 5 is receiving the image signal (step 7). In the case when the display 5 is receiving the signal, the sign is removed from the screen (step 15), and broadcast of the image is started (step 16). If the display 5 is determined to be not yet receiving the image signal, the timer 16 continues to count the interval.

When the timer 16 determines that the period of time counted is reached to the predetermined period of time, the brightness of the backlight 13 is significantly lowered and the power consumption is decreased (step 9) if the display 5 is not receiving the image signal. Concurrently with significantly lowering the brightness of the backlight 13, the timer 16 starts to count the interval again (step 10). The period of time in which the sign is not displayed on the screen is predetermined and the timer 16 determines whether or not the period counted is reached to the predetermined period of time (step 11). If the period counted is not reached to the predetermined period of time, a determination is made as to whether the display 5 is receiving the image signal (step 12). In the case when the display 5 is receiving the signal, the sign is removed from the screen (step 15), and broadcast of the image is started (step 16). In the case when the display 5 is determined to be not yet receiving the image signal, the timer 16 continues to count. When the timer 16 determines the period counted is reached to the predetermined period, the brightness of the backlight 13 is set back to the condition before lowering the brightness (step 14) if the display 5 is not receiving the image signal. Then, the sign is displayed on the screen for the viewer clearly (step 4). Because other operation in FIG. 8 is the same as that of shown in FIG. 7, the explanation of the other operation will be omitted.

Finally, according to the present invention, a significant effect, that is, elimination of unnecessary power consumption, can be achieved by turning off the power of the backlight while the sign is not displayed on the screen. The power saving effect is significant especially in displays for broadcasting and commercial-use because many of monitors are in operation in a steady basis. According to the present invention, the reduction of power consumption and indication of no-signal to viewers can be performed concurrently within a predetermined period of time. Further, according to the present invention, the frequency of usage for the backlight can be reduced during the time when the backlight is not required. Thereby, the life of the backlight, its related parts and the like can be extended. Therefore, the present invention has an advantage from a viewpoint of maintenance and parts costs.

In addition, the present invention can adapt the period of time for indicating the sign to the preferences of viewers by counting a period of time from the appearance of the sign to the disappearance of the sign by a timer and enabling to adjust the period at the viewer's discretion. Because the preferences for the indication interval are vary by viewers, a configuration can be made according to their needs. In a case when the period of time in which the sign is disappeared from the screen, is too long, it creates confusions to viewers that they don't know what is going on. This undesirable effect can be prevented by enabling to adjust the period of time freely.

The present invention has been explained concretely using the plurality of the drawings and flowcharts. Needless to say, the present invention is not limited to those and no matter how the present invention is carried out, it falls within the technical scope of the present invention as long as the product includes the essential part of the present invention. For example, application of the display apparatus of the present invention is not limited to the displays for television receivers, such as displays for liquid crystal televisions, displays for organic EL television and the like, described above, and the display apparatus may also be applied to displays for personal computers and the like.

What is claimed is:

1. A display apparatus comprising:
   a display device for displaying an image;
   a backlight for providing a light to the display device; and
   a controller for controlling the display device and the backlight
   wherein while no input signal is detected from outside of the display apparatus, the display apparatus alternately repeats a) and b):
   a) the controller makes the display device display a message indicating that there is no image signal inputted to the display apparatus, where the message is displayed for a first predetermined period of time; and
   b) the controller turns off a power of the backlight for a second predetermined period of time.

2. The display apparatus of claim 1, wherein the controller turns on the power of the backlight while the message is on the display device.

3. The display apparatus of claim 1, further comprising:
   a timer for counting the first and second period of time.

4. The display apparatus of claim 3, wherein the first period of time is less than the second period of time.

5. The display apparatus of claim 1, wherein the first and second predetermined period of time can be adjusted by a viewer of the display apparatus.

6. A display apparatus device, the display apparatus, comprising:
   a display device for displaying an image;
   a backlight for providing a light to the display device; and
   a controller for controlling the display device and the backlight
   wherein while no input signal is detected from outside of the display apparatus, the controller makes the display device display a message indicating that there is no image signal inputted to the display apparatus and the display apparatus alternately repeats a) and b):
   a) the controller provides a first electric power to the backlight for a first predetermined period of time; and
   b) the controller provides a second electric power to the backlight for a second predetermined period of time wherein the second electric power is less than the first electric power.

7. The display apparatus of claim 6, wherein the second electric power to the backlight can be adjusted by a viewer of the display apparatus.

8. The display apparatus of claim 6, further comprising:
   a timer for counting the first and the second predetermined period of time.

9. The display apparatus of claim 6, wherein the first and the second predetermined period of time can be adjusted by a viewer of the display apparatus.

10. The display apparatus of claim 6, wherein the first predetermined period of time is shorter than the second predetermined period of time.

11. The display apparatus of claim 6, wherein the display device is a liquid crystal display.

12. A method of reducing electronic power consumption of a display apparatus including a display device and a backlight, the method comprising the steps of:
    a) displaying a message on the display device for a first predetermined period of time when an input signal is not detected from outside of the display apparatus, the message indicating that there is no image signal inputted to the display apparatus;
    b) turning off a power to the backlight for a second predetermined period of time when the input signal is still not detected from outside of the display apparatus; and
    c) repeating the steps a) and b) when the input signal is still not detected from outside of the display apparatus.

13. The method of claim 12, wherein the power to the backlight is turned on while the message is indicated on the display device.

14. The method of claim 13, wherein the message is intermittently indicated on the display device.

* * * * *